March 21, 1944.  H. D. ALLEE  2,344,582
GASOLINE TANK FILLER
Filed May 11, 1940
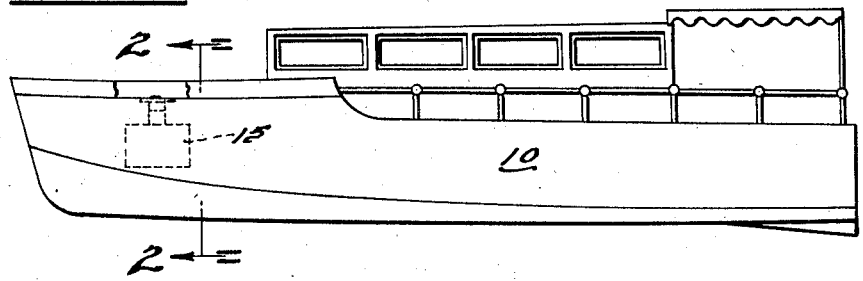
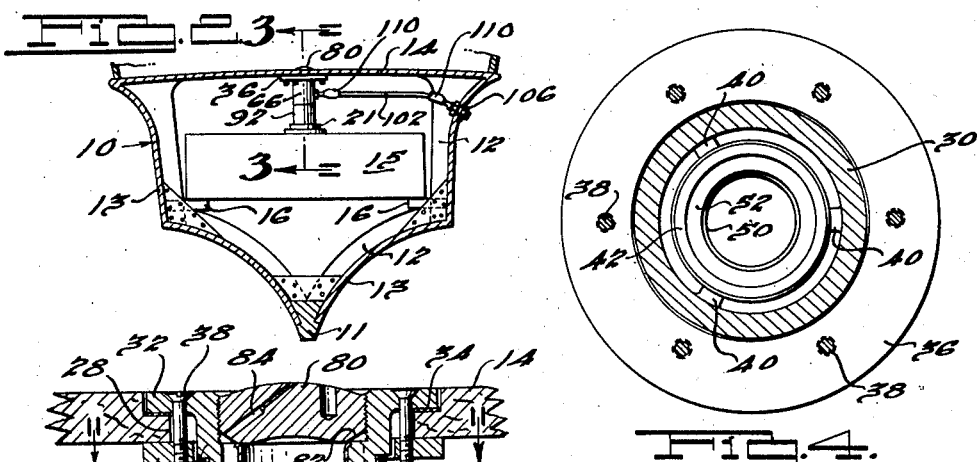
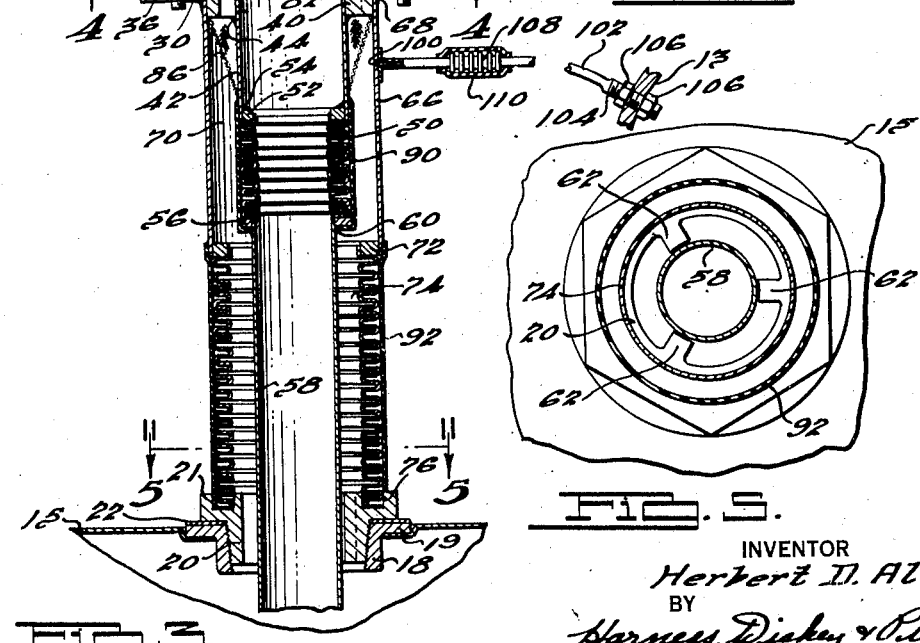
INVENTOR
Herbert D. Allee.
BY
Harness, Dickey & Pierce
ATTORNEYS.

Patented Mar. 21, 1944

2,344,582

UNITED STATES PATENT OFFICE 2,344,582

GASOLINE TANK FILLER

Herbert D. Allee, Grosse Pointe, Mich.

Application May 11, 1940, Serial No. 335,160

10 Claims. (Cl. 220—86)

This invention relates to fuel tank filling devices of a type that is applicable, among other uses, to power boats, and particularly to such devices as are employed in connection with those constructions wherein the filler opening through which the fuel is fed to the tank is located at a material distance from the tank, the principal object being the provision of a device of the type described that is efficient in operation, relatively simple in construction and is designed particularly to eliminate fire hazard in connection with such devices.

Objects of the invention include the provision of a device of the type described constructed for the most part of substantially solid and unyieldable tubes so arranged and connected as to enable it to withstand the racking and weaving of the filler opening portion of the device with respect to the tank portion of the device and without placing the connection or the part which it connects, under any undue strain, or otherwise affecting the operativeness thereof; the provision of a device of the type described including a filler opening element and a tank element carried by different parts of a boat or other structure and connected to each thereof, the device being constructed principally of solid tubing so flexibly connected to one of the parts by imperforate means as to permit a relatively great mis-alignment or displacement of one of the parts with respect to the other without endangering rupture of the device or of the parts connected thereby; the provision of such a structure in which means are provided for carrying off the air in the tank displaced by the fuel being fed thereto and without interfering with the free flow of fuel to the tank; the provision of a device of the type described including a fuel vent passage separate from the fuel entrance passage and both of which passages are provided with a common closure member; the provision of a device of the type including a pair of substantially concentric tubular members each including a rigid imperforate metallic member and a yieldable imperforate tubular member; the provision of a device of the type described in which the yieldable imperforate tubular member consists of a metallic Sylphon or bellows; and the provision of a device of the type described in which means are provided for damping the natural vibratory tendencies of the Sylphon or bellows.

Other objects of the invention include the provision of a fuel tank filler device including inner and outer tubular members forming an air escape passage between them for use during a filling operation, and having a separate breather pipe connected into said passage and leading to the atmosphere at a point remote to the inlet end of said device, said pipe having one or more metallic bellows inserted therein as a part of the length thereof to impart flexibility thereto; and the provision of a construction as above described wherein the pipe connects with said passage at a point therein below a safety screen inserted in said passage.

Further objects of the invention include the provision of a yieldable tubular connection including a rigid tubular member and a Sylphon or metal bellows sealed to one end thereof, together with means in embracing relationship with respect to said Sylphon or bellows to provide a damping effect on movements of the Sylphon or bellows; the provision of a device of the type described in which the means in the surrounding relationship with respect to the Sylphon or bellows comprises an elastic member arranged in contracting relationship with respect to the exterior surface of the Sylphon or bellows; and the provision of a device of the type described in which the elastic surrounding the member is constructed of a material impervious to the effects of fuel coming in contact therewith.

Still further objects of the invention include the provision of means for damping the vibrations tending to be set up in a metallic Sylphon or bellows as a result of vibratory influences applied to the same; the provision of a metallic bellows or Sylphon having a yieldable non-metallic element pressing against the convolutions thereof for the purpose of damping vibrations thereof; and the provision of a metallic yieldable Sylphon or bellows having an elastic non-metallic member arranged in substantially enveloping relation with respect thereto and resiliently gripping the same.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a partially broken side elevational view of a power boat of the cruiser type;

Fig. 2 is an enlarged, vertical sectional view taken in a plane perpendicular to the length of the boat as on the line 2—2 of Fig. 1, and showing the fuel tank provided with a filler device constructed in accordance with the present invention;

Fig. 3 is a still further enlarged vertical sectional view taken axially through the filler device as on the line 3—3 of Fig. 2, fragments of the deck and planking of the boat and of the fuel tank being shown in connection therewith;

Fig. 4 is a horizontal sectional view taken on the line 4—4 of Fig. 3; and,

Fig. 5 is a horizontal sectional view taken on the line 5—5 of Fig. 3.

In its broader aspects the present invention and particularly certain phases thereof is applicable to uses other than in connection with power driven vessels, as, for instance, motor boats, but inasmuch as the benefits of the present invention are particularly important in connection with motor boats, for the purpose of brevity the description of the present invention will be limited solely thereto, its application to other uses being made known to those skilled in the art thereby.

In motor boats of the larger types, such as, for instance, those commonly known as cruisers, it is conventional practice to place the fuel tank as near the keel of the boat as possible in order to lower the center of gravity of the boat and, consequently, because of the usual depth of the hulls of such boats it is necessary to extend a duct from the fuel tank to some point as on the deck of the boat in order to provide a ready means of filling the tank with fuel. Prior to my prior United States Letters Patent No. 1,952,484, issued to me on March 27, 1934, it had been common practice to simply extend a solid pipe from the fuel tank to a suitable fitting in the deck provided with a closure of any suitable type. The closure in some cases was vented in order to permit the fuel drawn out of the tank during operation of the motor to be replaced by an equal volume of air, and in other cases a separate pipe, usually of a smaller diameter but of a solid construction, was extended between the top of the tank and some exterior surface of the boat not only to permit the escape of air from the tank during the filling of the tank, but also to replace the fuel withdrawn from the tank during operation of the motor with a like amount of air. The latter described construction was preferable to the first described for the reason that the escape of air through a separate pipe did not interfere with the fuel flowing into the tank during the filling operation as occurred in the first mentioned construction.

In any case the fuel tank was secured to and supported by the frame members of the hull at or adjacent the bottom thereof and the filler opening end of the connection was supported by the deck or in a position proximate thereto. As is well known by those skilled in the art, when a boat of this type encounters a heavy sea which exerts a twisting, bending, and other forces on the hull, the hull actually gives under such forces and is caused to weave. In other words a relative movement is caused between the different parts of the hull and particularly between the bottom of the boat and the deck. Accordingly, where the prior conventional fuel tank filling device embodied rigid connecting members was incorporated in a boat that was weaving, such filler connection, because of its rigid connection, was subjected to a considerable strain which was, of course, also transmitted to the filler opening member and to the fuel tank. The result was that the solid tube was often ruptured or broken, the filler opening member sometimes torn loose from the deck, and sometimes the fuel tank itself was ruptured adjacent its point of connection with the tube, or torn loose from its support.

The same relative movement, of course, occurred in connection with a separate breather tube when employed and constructed as a solid tube as previously described. In either case should either one of the other tubes break or be ruptured, or if the fuel tank itself become ruptured, fumes from the fuel tank, and oftentimes the fuel itself, escaped into the interior of the hull where it constituted serious fire and other hazards.

My previous patent above referred to obviated the disadvantages of the prior construction in that it provided a flexible filler tube between the deck of the boat and the fuel tank, the tube being capable of bending and stretching or compressing to accommodate itself to any weaving of the boat hull without exerting any material stress upon the tube, the deck connection, or the tank. Additionally, the construction provided by my prior patent provided one flexible tube within another, the central tube providing the true fuel filler tube while the space between the inner tube and the outer tube constituted an air escape passage through which air in the fuel tank displaced by the entering fuel during a filling operation could readily escape without interfering with the free flow of fuel into the tank through the central tube. Both tubes were suitably sealed to the deck connection provided with an opening common to both tubes and provided with a single closure member therefor. The flexible tube employed in my previous patent was disclosed as of the spirally wound metal type commonly found on the market and having the adjacent edges of adjacent turns thereof suitably interlocked and sealed to one another to provide a substantially fluid type structure.

I have found, however, that there has been an objection to the use of flexible hose of the type described among the boat manufacturers due to a distrust in the reliability of such spiral metal tubes. In other words there is a question in their minds as to the reliability of such tubing and a fear that it will leak, as for instance between the turns thereof, and permit the escape of fuel or of the fumes thereof into the interior of the boat hull and there constitute a fire hazard. The present invention is designed to overcome such disadvantages, fancied or otherwise, that exist in my prior structure as above described. This is accomplished by constructing the tubular portions of the device of solid tubing, a major portion of which may be formed from rigid unyielding tubing and the remainder of which is formed from imperforate but yieldable metallic tubular elements imparting the required flexibility to the entire construction to attain the desired end of eliminating undue stresses in the connection or to its points of securement with the deck or the fuel tank. Where a separate breather tube is employed to connect the space between the tubular portions with a point remote to the filler opening, the breather tube is also provided with such yieldable metallic tubular elements therein for the same purpose.

The particular form of imperforate flexible tubular members employed in accordance with the present invention are what are commonly known as Sylphons or metal bellows. These are employed so as to form a portion only of the length of each of the tubes and, being readily flexible and yieldable, permit lateral as well as longitudinal displacement of the normally intended point of connection of the device with the deck of the boat in relation to its point of connection with the fuel tank.

Although probably unnecessary in the majority of cases, an additional feature of the present invention may be employed to obviate possible disadvantages arising from certain inherent characteristics of such metallic Sylphons or bellows. As is commonly understood in the art such Sylphons or bellows are constructed of relatively thin metal and are capable of a relatively great amount of distortion. They are, however, subject to premature rupture when continually vibrated at a relatively high rate even at a small amplitude, due to crystallization of the metal thereof. When connected to some member subject to a relatively high rate of vibratory disturbance, if unrestrained they are liable to vibrate in sympathy therewith, thus fostering early destruction. In order to prevent vibratory movement of such Sylphon or bellows except as required to permit the desired flexibility of the connection between the opposite ends of the tube, I provide means for damping the natural vibratory movements of the Sylphon or bellows. This is accomplished by associating with the Sylphon or bellows a resilient or yieldable non-metallic element pressed into contact with the various convolutions thereof. Preferably such element takes the form of a tube or sleeve of such material encircling the bellows and contracted thereon. Preferably it takes the form of rubber or rubber-like material preferably impervious to the effects of fuel coming in contact therewith and preferably sealed to the device at opposite ends of the Sylphon or bellows so as to further form a safety feature in event the Sylphon or bellows should rupture for any reason.

Referring now to the accompanying drawing I show a boat indicated generally at 10 of the cruiser type. As indicated in Fig. 2 the hull of the boat may include the usual keel 11, frame members 12, planking 13 and a deck 14. A fuel tank 15 may be supported on and secured to brackets such as 16 in turn secured to the frame members 12, in any suitable manner, but preferably so that weaving of the hull will not subject the structure of the tank itself to any undue strain.

As indicated best in Fig. 3, the tank 15 is provided with an opening in its upper surface through which projects a sleeve or collar 18 provided with an annular outwardly directed flange 19 overlying the upper wall of the tank and suitably sealed to the tank 15 as by welding, soldering, brazing or the like. The collar 18 is internally threaded, and threadably received therein is the externally threaded surface of a sleeve member 20 having a radially outwardly directed flange portion 21 at its upper end, preferably of hexagonal or other irregular shape for convenient reception of a wrench or the like, and if desired a gasket such as 22 may be provided between the flange 19 of the collar 18 and the flange 21 of the collar 20 to further perfect the seal between them.

The deck 14 is provided with an opening 28 therein, preferably in vertical alignment with the collars 18 and 20 when the boat hull is in static condition. Received in the opening 28 is an internally threaded collar 30 provided with a radially outwardly directed annular flange 32 at its upper end overlying the upper margins of the deck surrounding the opening 28 but preferably arranged with its upper face in flush relationship with respect to the surface of the deck. A gasket 34 or some suitable type of sealing compound is preferably interposed between the bottom face of the flange 32 and the cooperating face of the deck 14 so as to seal the joint between them against leakage. The collar 30 preferably projects downwardly below the lower surface of the deck 14 and receives thereon a ring 36. Screws 38 project down through the flange 32 and thread into the ring 36 for the purpose of permitting the flange 32 to be drawn tightly down into contact with the deck to rigidly secure the collar 30 in position.

The collar 30 is provided with a plurality of preferably equally angularly spaced inwardly projecting lugs 40 in the lower portion of its bore. At least three of such legs are preferably employed as shown for the purpose of enabling it to positively center the tube 42 therein. The tube 42 is of an external diameter equal or substantially equal to the circle defined by the radially inner faces of the lugs 40 and its upper end is received therein as indicated. Preferably the upper inner edges of the lugs 40 are preferably cut away as indicated in Fig. 3 and the upper end of the tube 42 is outwardly flared so as to mechanically interlock it against dropping downwardly in the collar 30 and to provide a valve seating surface as will hereafter be more fully explained. Additionally, the tube 42 may be welded, brazed or otherwise secured to the lugs 40 as indicated at 44 for the purpose of further fixing it to such lugs. The tube 42 is of a rigid imperforate type and preferably formed from seamless tubing of the type conventionally found upon the market. The tube 42 may be of any desired length depending upon the particular installation to which it is adapted, but in the particular case shown where the upper surface of the fuel tank 15 is spaced relatively close to the deck 14, it terminates a short but material distance below the lower end of the collar 30. Such lower end of the tube 42 is sealed to the upper end of a conventional metallic Sylphon or bellows 50. To facilitate the connection between the Sylphon 50 and the tube 42, the upper end of the Sylphon or bellows 50 is preferably sealed to a ring 52 which is received within the lower end of the tube 42 and which in turn is welded or brazed as at 54 directly to the tube 42.

The lower end of the Sylphon or bellows 50 is in turn suitably sealed to a ring 56 which in turn receives thereon the upper end of another rigid imperforate tube 58, also preferably of the seamless type and which is preferably welded, brazed or soldered as at 60 to the ring 56. The tube 58 extends downwardly from the Sylphon or bellows 50 and projects down into the upper portion of the fuel tank 15 preferably at a point adjacent the bottom of the tank so as to eliminate the possibility of its acting as a breather pipe. The tube 58 is of materially smaller external diameter than the internal diameter of the collar 20 and is spaced from the interior walls or bore of the collar 20 by means of a plurality of lugs 62 formed integrally with the collar 20 and projecting radially inwardly thereof in the same manner as the lugs 40 previously described, the tube 58 preferably having a relatively loose fit between the lugs 62 so as to permit a small amount of angular movement of the tube 58 with respect to the collar 20.

A tube 66 of the rigid imperforate type and preferably of the seamless type and of considerably larger diameter than the tubes 42 and 58 is piloted at its upper end upon the lower end of the collar 30 and is preferably sealed thereto as by welding, brazing, or soldering as indicated at 68. In the particular embodiment shown the tube 66 being considerably larger than the tube 42, it provides a space 70 between its interior surface of the exterior surface of the tube 42 and Sylphon or bellows 50 serving as an air escape passage as will hereinafter be more fully described. At its lower end the tube 66 receives therein a ring 72 to which the upper end of a second Sylphon or metallic bellows 74 is sealed, the Sylphon or bellows 74 likewise being materially larger in diameter than the tube 58 so as to also form an air escape passage of material dimensions between it and the tube 58. While another rigid tube might be employed to connect the lower end of the Sylphon or bellows 74 with the tank 15, in the particular construction shown by way of illustration the lower end of the bellows 74 extends downwardly to the flange 21 of the collar 20 the upper surface of which is provided with an annular groove 76 in which the lower end of the Sylphon or bellows 74 is directly received and sealed as by soldering, brazing or the like.

It will be appreciated from the above description that the inner tubular element of the device comprising the tubes 42 and 58 together with the interconnected Sylphon or bellows 50 forms a fuel intake passage and that the space between such inner elements and the outer elements formed by the tube 66 and Sylphon or bellows 74 forms an air escape passage to permit air displaced from the fuel tank 15 during a filling operation to escape to the atmosphere without interfering with the free flow of fuel downwardly through the inner tubular elements. The upper ends of both tubular elements open into bore of the collar 30 which is provided with a removable plug 80 threadably received therein for the purpose of enabling both of such passages to be simultaneously closed. It will be noted from an inspection of Fig. 3 that the lower outer edge of the plug 80 is beveled as at 82 to form a valve cooperable with the upper outturned end of the tube 42 as a seat to positively close the tube 42. A vent passage 84 extends from the beveled surface 82, radially outwardly of the corresponding end of the tube 42, to the upper surface of the plug 80 so as to admit air downwardly through the passage 70 to the interior of the fuel tank 15 to replace the fuel drawn therefrom during operation of the engine of the boat.

In order to prevent any possibility of any flame being carried down through the vent passage 84 from reaching the contents of the fuel tank 15, a fine wire screen 86, of frusto-conical nature, is preferably interposed between the tubes 42 and 66 immediately below the collar 30 as illustrated in Fig. 3. It will be appreciated that the screen 86 serves the same purpose as the screen in a miner's lamp in preventing the transmission of flame through the same, thus providing an additional safety factor.

Under some conditions some boat builders or owners may desire, and it may be advisable, to eliminate the vent opening 84 in the cap 80 and to provide a separate breather tube connecting the space between the tubular members to the atmosphere at a point remote to the filler opening of the device, or to provide such breather tube in conjunction with the vent opening 84. Under such circumstances a hole such as 100, illustrated in Fig. 3, may be provided in the tube 66 and this hole 100 may be connected to a breather tube or pipe 102. The outer end of the tube 102 may be led to the atmosphere at any point on the exterior of the boat hull and preferably at a point remote from the cap 80. It may, for instance, be projected out through the planking 13 of the hull above the water line but below the deck as illustrated in Fig. 2. The tube 102 may, of course, be of relatively small diameter inasmuch as its only function is to permit air to flow into the fuel tank 15 to replace the fuel drawn out of the same by and during operation of the engine driving the boat and its inner end may be suitably flanged and soldered, brazed or otherwise suitably secured to the outer surface of the tube 66 over the hole 100 as illustrated in Fig. 3. Preferably its outer end may be suitably fixed and sealed to a threaded sleeve 104 which projects through the planking 13 and is suitably held and sealed in place therein by means of nuts 106 thereon on opposite sides of the planking 13.

In order to render the tube 102 sufficiently flexible to attain the purpose of the present invention, one or more metallic Sylphons or bellows 108 are interposed in its length in any suitable manner such, for instance, as the manner in which the bellows 50 is inserted between the tubes 42 and 58. It will, of course, be appreciated that the insertion of the bellows 108 imparts to the tube 102 the same flexible characteristics as the bellows 50 and 74 impart to the tubes of the filler device proper. In any event, however, it is desirable that the tube 132 connects with the space between the tubes 42 and 66 at a point therein below the screen 86. It will be appreciated that it may be desirable to use a vent tube such as the tube 102 whether the vent passage 84 is provided in the cap 80 or not.

The operation of the device thus far described is believed apparent. The Sylphons or bellows 50 and 74 being of a readily flexible nature and being capable of a relatively great amount of axial elongation and collapsing without danger of rupture, will permit the usual amount of vertical movement between the deck and fuel tank without placing the filler device under any undue strain or stress, or without placing the connection between it and the deck and the fuel tank under any undue stress. Furthermore, because of the ability of such Sylphons or bellows to permit displacement of one end thereof laterally with respect to the other end thereof without placing them under any undue stress, any lateral weaving of the deck of the boat with respect to the fuel tank will simply be accompanied by a lateral displacement of the opposite ends of the Sylphons or bellows 50 and 74 without subjecting any parts of the connection or of the parts connected thereby to any destructive forces. Accordingly, it will be understood that the device of the present invention provides all of the advantages of the construction covered by my previous patent above identified but also includes the further advantages of providing a construction having solid tubular walls eliminating the distrust of boat manufacturers and users to my prior construction because of its use of flexible tubing of the spirally wound type.

While I have indicated a construction in the accompanying drawing in which the inner and outer tubular elements of the connection each include but a single metallic Sylphon or bellows, it will be appreciated that where desired and particularly where the connection is of relatively great length, any desired number of Sylphons or bellows sections and alternate rigid tubular sections may be employed if desired. Furthermore, while in the particular construction shown by way of illustration the Sylphons or bellows themselves are not arranged one within the other, this has been shown merely by way of expediency and not because of necessity, as it will be appreciated that by judicious selection of Sylphon or bellows sizes one may be arranged within the other and a sufficiently large air escape passage be provided between them to serve the intents and purposes of the present invention.

Metallic Sylphons or bellows such as the Sylphons or bellows 50 and 74 shown and described are commonly understood to be capable of relatively great elongation and contraction, as well as lateral displacement of one end with respect to the other, and are capable of standing up under relatively long periods of usage where such movements of the bellows are not excessive and particularly where they do not occur over long periods of time at high rates of speed. Because of their relatively light nature they are prone to vibrate in sympathy with associated highly vibrated parts, and particularly where the rate of vibration of such parts approaches the natural period of vibration of the bellows. In accordance with a further phase of the present invention and in a broader sense regardless of whether the bellows are employed in the particular connecting device disclosed and described, but of material advantage and forming a further part of the broad concept of such connection, I provide means for preventing the Sylphons or bellows from vibrating in sympathy with associated vibrating parts and particularly from vibrating at its natural period of vibration solely because of the vibration of an associated part not otherwise requiring relative movement between the opposite ends of the Sylphon or bellows.

In the broader aspects this damping means may consist of any yieldable non-metallic sleeve-like member embracing either the interior or exterior convolutions of the bellows over a material portion and preferably the entire length of the bellows. Ordinarily it will be more convenient to provide such damping member in encircling relation with respect to the exterior surface of the bellows and arranged in contracting relationship thereon. In the broader aspects the material from which this damping member is constructed may be of any suitable yieldable non-metallic material pressed into contact with the majority of the convolutions of the Sylphon or bellows. In other words it may be of suitable fabric or fibrous nature and where arranged on the exterior of the bellows may, for instance, be constructed of a fabric sleeve of such woven nature as to constantly tend to grip the Sylphon or bellows therein. Preferably, however, it is formed of suitable rubber or rubber-like material preferably having the characteristic of being resistant to the effects of the fuel upon coming into contact therewith, so-called synthetic rubbers as, for instance, the material now being marketed under the trade-name "Duprene," being preferred as these are resistant to the effects of hydrocarbons.

Such sleeve is indicated in Fig. 3 at 90 and as exteriorly embracing the Sylphon or metal bellows 50. Particularly where made from rubber or rubber-like material as above described the sleeve 90 in its initial state is preferably of a diameter slightly less than the exterior diameter of the Sylphon or bellows 50 so that it must be expanded for reception of the bellows therein, its tendency to contract causing it to evenly grip the outer portions of the convolutions of the bellows 50. Also as indicated in Fig. 3 it is preferable to have the upper end of the sleeve 90 extend upwardly and embrace the lower end of the tube 42 therein and to have the lower end thereof extend downwardly beyond the lower face of the ring 56 and turned radially inwardly under the same. This arrangement brings the sleeve 90 into contact with all of the convolutions of the Sylphon or bellows 50 and imparts the maximum damping action of the Sylphon or bellows.

The Sylphon or bellows 74 is likewise provided with a surrounding sleeve 92 which may be formed of the same material as the sleeve 90 and which cooperates with the Sylphon or bellows 74 in identically the same manner that the sleeve 90 cooperates with the Sylphon or bellows 50 as above described. As in the case of the sleeve 90, the sleeve 92 preferably extends upwardly and embraces the lower end of the tube 66 therein. While the lower end of the sleeve 92 could be expanded to fit around the flange 21 of the collar 20, as a matter of illustration it is shown simply as extending downwardly to the upper face of the flange 21. The sleeve 92 has the same advantages in connection with the Sylphon or bellows 74 as the sleeve 90 in connection with the Sylphon or bellows 50 and as above described, as far as the damping action on the Sylphon or bellows is concerned, but in this case the sleeve 92 forming an exterior wall of the connection, further serves to prevent the escape of fuel or of fumes from the interior of the connection to the interior of the boat should the Sylphon or bellows 74 become ruptured for one reason or another, thus having an additional advantage in this particular case. It will, of course, be appreciated that even though the tube 92 is not commensurate with the length shown but encircles a smaller number of convolutions of the bellows 74, nevertheless because of its contracting tendency on the bellows, should a rupture of the bellows occur within the length of the sleeve it will serve to prevent leakage through the rupture inasmuch as its contact with the various convolutions effects a seal of the space between adjacent convolutions thus covered.

Where a breather tube such as the breather tube 102 is employed and provided with metallic bellows such as the bellows 108, it will also be desirable to provide such bellows 108 with a layer of yieldable non-metallic material for the same purposes as equivalent layers are provided as above described, and as in the case of the bellows 50 and 74 such yieldable non-metallic layers will usually take the form of an embracing sleeve 110 of rubber-like material surrounding the bellows 108, thereby obtaining the same advantages as are obtained in connection with the sleeve 92 about the bellows 74.

It will be understood that the character of the sleeves 90 and 92 is such that while they will dampen the vibratory movement of the corresponding bellows, they are of such flexibility or yieldability to permit the desired elongation or contraction of the metal bellows, or of bending or other distortion thereof under the stresses to which they are subjected during movement of the deck 14 with respect to the fuel tank 15 without subjecting the metal bellows, the tubes 42 or 58 or the connection between the opposite ends of the tubes and bellows with the deck and tank fittings, respectively, or the deck or tank themselves, to undesirably great stresses. The construction provides an ample degree of flexibility in the connection to eliminate undesirable or dangerous stresses from being set up in the connection and yet is constructed from imperforate wall tubing elements thereby eliminating the real or fancied objections to my prior construction previously pointed out.

Formal changes may be made in the specific embodiment of the invention described without departing from the spirit or substance of the broad invention, the scope of which is commensurate with the appended claims.

What is claimed is:

1. A fuel tank filler device or the like comprising a pair of end members each having an opening therein, and a pair of tubular elements extending between said end members and arranged one within the other to form a passage therebetween, the outer of said tubular elements being sealed to both said end members and the inner of said tubular elements being supported by at least one of said end members, said tubular elements each comprising a plurality of sections, some of said sections each comprising a substantially rigid imperforate metal tube and the remainder of said sections each comprising a flexible metal bellows sealed to at least one of said rigid sections, metal bellows sections of said tubular elements occupying a position in the length of each thereof corresponding with the position of one of said rigid sections in the length of the other thereof.

2. A fuel tank filler device or the like comprising a pair of end members each having an opening therein, a pair of tubular elements extending between said end members and arranged one within the other to form a passage therebetween, the outer of said tubular elements being sealed to both said end members and the inner of said tubular elements being supported by at least one of said end members, said tubular elements each comprising a plurality of sections, some of said sections each comprising a substantially rigid imperforate metal tube and the remainder of said sections each comprising a flexible metal bellows sealed to at least one of said rigid sections, and of jointless yielding non-metallic means and of readily extensible and contractible nature maintained in non-continuous surface contact with at least a portion of the convolutions of said bellows serving to dampen the natural vibratory tendencies thereof.

3. A fuel tank filler device or the like comprising a pair of end members each having an opening therein, a pair of tubular elements extending between said end members and arranged one within the other to form a passage therebetween, the outer of said tubular elements being sealed to both said end members and the inner of said tubular elements being supported by at least one of said end members, said tubular elements each comprising a plurality of sections, some of said sections each comprising a substantially rigid imperforate metal tube and the remainder of said sections each comprising a flexible metal bellows sealed to at least one of said rigid sections, the metal bellows sections of said tubular elements occupying a position in the length of each thereof corresponding with the position of one of said rigid sections in the length of the other thereof and an axially extensible and contractible non-metallic sleeve surrounding each of said bellows in peripherally interrupted contact therewith and readily yieldable therewith for the purpose of dampening the natural vibratory tendencies of said bellows.

4. A fuel tank filler device or the like comprising a pair of end members each having an opening therein, a pair of tubular elements extending between said end members and arranged one within the other to form a passage therebetween, the outer of said tubular elements being sealed to both said end members and the inner of said tubular elements being supported by at least one of said end members, said tubular elements each comprising a plurality of sections, some of said sections each comprising a substantially rigid imperforate metal tube and the remainder of said sections each comprising a flexible metal bellows sealed to at least one of said rigid sections, and a readily stretchable sleeve of flexible rubber-like material surrounding and resiliently embracing each of said bellows in peripherally interrupted contact therewith.

5. A fuel tank filler device or the like comprising a pair of end members each having an opening therein, a pair of tubular elements extending between said end members and arranged one within the other to form a passage therebetween, the outer of said tubular elements being sealed to both said end members and the inner of said tubular elements being supported by at least one of said end members, said tubular elements each comprising a plurality of sections, some of said sections each comprising a substantially rigid imperforate metal tube and the remainder of said sections each comprising a flexible metal bellows sealed to at least one of said rigid sections, the metal bellows sections of said tubular elements occupying a position in the length of each thereof corresponding with the position of one of said rigid sections in the length of the other thereof and a readily expansible and contractible sleeve of flexible rubber-like material enveloping each of said bellows in peripherally interrupted contact therewith.

6. The combination with a flexible metallic bellows having a relatively thin wall section and subject to vibratory influences, of a readily yieldable non-metallic element resiliently embracing a plurality of the corrugations of said bellows at their outer periphery only when said bellows is in substantially free and unstressed condition and serving to dampen the vibratory tendencies thereof.

7. The combination of a flexible metallic bellows of the corrugated wall type subject to movement under the vibratory influences of connected vibrating parts, of a readily yieldable resilient non-metallic sleeve arranged in contracting relationship with respect to the high points only of the corrugations of said bellows when said bellows is in substantially free and unstressed condition.

8. The combination of a flexible metallic bellows of the corrugated wall type subject to movement under the vibratory influences of connected vibrating parts, of a resilient readily stretchable non-metallic sleeve of rubber-like material arranged in contracting relationship upon the outer surface of said bellows and in contact only with the high points of the corrugations thereof when said bellows is in substantially free and unstressed condition.

9. In combination, a jointless tubular element of resiliently flexible character readily yieldable in a direction transversely of its length and axially extensible and contractible to a limited extent under the influence of axially directed forces acting thereon, and means for dampening vibratory movements of said element comprising a non-metallic element in surrounding tensioned engagement and in non-continuous peripheral contact with the first-mentioned element when the latter is in substantially free and unstressed condition and yieldable therewith in response to forces acting transversely and axially thereof.

10. In combination, a thin walled jointless resilient metallic hollow element the walls of which form alternate radially inwardly and radially outwardly opening grooves over the length thereof which grooves form alternate radially outwardly and radially inwardly directed high points, and a sleeve of readily yieldable non-metallic material arranged in contracting relationship with alternate of said high points when said element is in substantially free and unstressed condition and spaced from the bottoms and at least a portion of the sides of the intervening grooves.

HERBERT D. ALLEE.